(12) United States Patent
Jeong et al.

(10) Patent No.: US 12,183,950 B2
(45) Date of Patent: Dec. 31, 2024

(54) SEPARATOR AND ELECTROCHEMICAL DEVICE COMPRISING SAME

(71) Applicant: LG ENERGY SOLUTION, LTD., Seoul (KR)

(72) Inventors: So-Mi Jeong, Daejeon (KR); Dong-Wook Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 545 days.

(21) Appl. No.: 17/617,773

(22) PCT Filed: Jun. 8, 2020

(86) PCT No.: PCT/KR2020/007414
§ 371 (c)(1),
(2) Date: Dec. 9, 2021

(87) PCT Pub. No.: WO2020/251230
PCT Pub. Date: Dec. 17, 2020

(65) Prior Publication Data
US 2022/0238960 A1 Jul. 28, 2022

(30) Foreign Application Priority Data
Jun. 14, 2019 (KR) .................. 10-2019-0070943

(51) Int. Cl.
*H01M 50/426* (2021.01)
*H01M 50/446* (2021.01)
(Continued)

(52) U.S. Cl.
CPC ....... *H01M 50/451* (2021.01); *H01M 50/426* (2021.01); *H01M 50/446* (2021.01); *H01M 10/0525* (2013.01)

(58) Field of Classification Search
None
See application file for complete search history.

(56) References Cited

U.S. PATENT DOCUMENTS

| 5,922,493 A | 7/1999 | Humphrey, Jr. et al. |
| 11,728,542 B2 * | 8/2023 | Lee ............... H01M 50/446 429/123 |

(Continued)

FOREIGN PATENT DOCUMENTS

| CN | 104051776 A | 9/2014 |
| EP | 2 528 141 B1 | 8/2014 |

(Continued)

OTHER PUBLICATIONS

Cho et al., "Enhanced Ferroelectric Property of P(VDF-TrFE-CTFE) Film Using Room-Temperature Crystallization for High-Performance Ferroelectric Device Applications", Advanced Electronic Materials, 2016, vol. 2, 1600225, total 7 pages.

(Continued)

*Primary Examiner* — Tracy M Dove
(74) *Attorney, Agent, or Firm* — Birch, Stewart, Kolasch & Birch, LLP

(57) ABSTRACT

A separator including a porous polymer substrate, and a porous coating layer, and an electrochemical device comprising the same. The porous coating layer includes P(VDF-TrFE-CTFE) and PVDF-CTFE as a binder polymer. The separator has a lower resistance by changing the characteristics of the binder polymer.

10 Claims, 1 Drawing Sheet

(51) Int. Cl.
*H01M 50/451* (2021.01)
*H01M 10/0525* (2010.01)

(56) References Cited

U.S. PATENT DOCUMENTS

| | | |
|---|---|---|
| 2011/0045338 A1 | 2/2011 | Bae et al. |
| 2013/0264522 A1 | 10/2013 | Stanga et al. |
| 2014/0098809 A1 | 4/2014 | Lawson et al. |
| 2014/0272505 A1 | 9/2014 | Yoon et al. |
| 2016/0079582 A1 | 3/2016 | Takeuchi et al. |
| 2016/0164060 A1 | 6/2016 | Zhang et al. |
| 2016/0218340 A1 | 7/2016 | Ryu et al. |
| 2016/0293999 A1 | 10/2016 | Kim et al. |
| 2017/0365878 A1 | 12/2017 | Ogata et al. |
| 2018/0047962 A1 | 2/2018 | Honda |
| 2018/0371194 A1 | 12/2018 | Abusleme et al. |
| 2019/0221811 A1 | 7/2019 | Kim et al. |

FOREIGN PATENT DOCUMENTS

| | | |
|---|---|---|
| JP | 2008-524824 A | 7/2008 |
| JP | 2011-515799 A | 5/2011 |
| JP | 2017-066350 A | 4/2017 |
| JP | 6178939 B2 | 8/2017 |
| JP | 2017-226121 A | 12/2017 |
| JP | 2017-536677 A | 12/2017 |
| KR | 10-2014-0012037 A | 1/2014 |
| KR | 10-2015-0070979 A | 6/2015 |
| KR | 10-2015-0115929 A | 10/2015 |
| KR | 10-1690515 B1 | 12/2016 |
| KR | 10-2018-0052108 A | 5/2018 |
| KR | 10-2018-0086211 A | 7/2018 |

OTHER PUBLICATIONS

International Search Report for PCT/KR2020/007414 mailed on Sep. 17, 2020.

Kundu et al., "On the Relevance of the Polar B-Phase of Poly(vinylidene fluoride) for High Performance Lithium-Ion Battery Separators", The Journal of Physical Chemistry C, 2017, vol. 121, pp. 26216-26225.

Ren et al., "Remarkably enhanced polarisability and breakdown strength in PVDF-based interactive polymer blends for advanced energy storage applications", Polymer, 2019, vol. 168, pp. 246-254.

\* cited by examiner

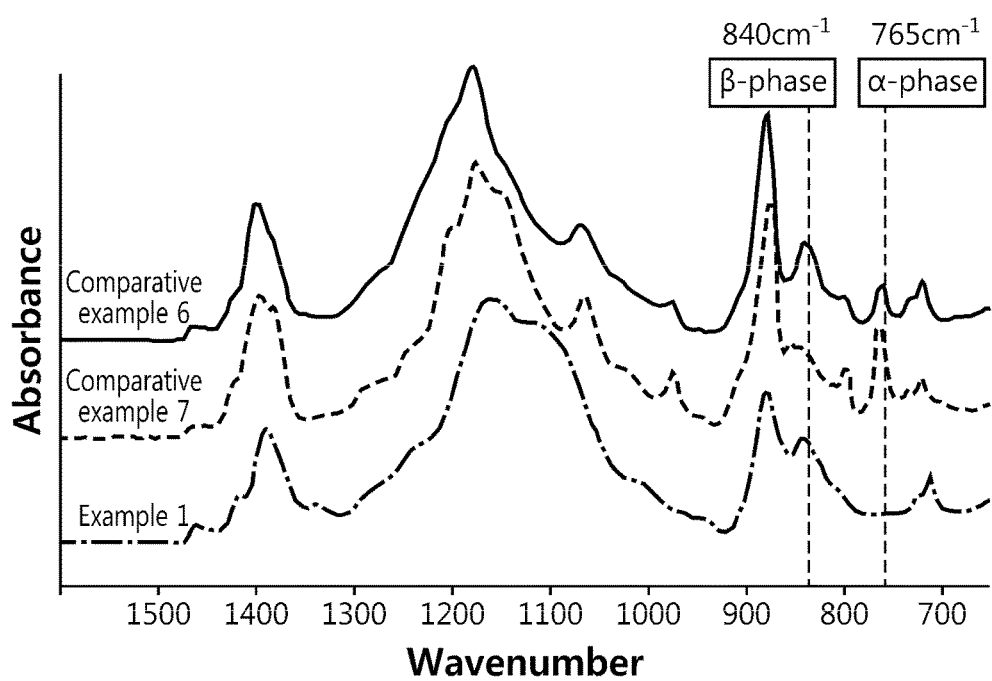

SEPARATOR AND ELECTROCHEMICAL DEVICE COMPRISING SAME

TECHNICAL FIELD

The present disclosure relates to a separator for use in an electrochemical device, for example, a lithium secondary battery, and an electrochemical device comprising the same.

The present application claims priority to Korean Patent Application No. 10-2019-0070943 filed in the Republic of Korea on Jun. 14, 2019, the disclosure of which is incorporated herein by reference.

BACKGROUND ART

Recently, there has been n easing interest in energy storage technology. As the application field of energy storage technology has been extended to mobile phones, camcorders, laptop computers, and even electric cars, many efforts have been devoted to studying and developing electrochemical devices. In this aspect, electrochemical devices are attracting more attention, and especially, development of rechargeable secondary batteries is the focus of attention, and more recently, in the development of batteries, new electrode and battery design for improving the capacity density and specific energy have been studied and developed.

In currently available secondary batteries, lithium secondary batteries developed in early 1990's have much higher operating voltage and energy density than traditional batteries using aqueous electrolyte solutions such as Ni-MH, Ni—Cd, lead-acid batteries, and by virtue of these advantages, lithium secondary batteries are gaining much attention.

Electrochemical devices including lithium secondary batteries are produced by many manufacturers, and each shows different safety characteristics. Assessment and management of the safety of electrochemical devices is very grave. The most important consideration is that electrochemical devices should not cause injury to users in the event of malfunction, and for this purpose. Safety Regulations strictly prohibit fire and flame in electrochemical devices. In the safety characteristics of electrochemical devices, overheating and eventual thermal runaway in electrochemical devices or piercing of separators poses a high risk of explosion. Particularly, polyolefin-based porous polymer substrates commonly used for separators of electrochemical devices show extremely severe thermal contraction behaviors at the temperature of 100° C. or above due to their properties of materials and manufacturing processes including stretching, causing a short circuit between the positive electrode (cathode) and the negative electrode (anode).

To solve the safety problem of electrochemical devices, suggestions have been made on a separator having a porous coating layer formed by coating a mixture of inorganic particles and a binder polymer on at least one surface of a porous polymer substrate having a plurality of pores.

DISCLOSURE

Technical Problem

An aspect of the present disclosure is directed to providing a separator with low resistance in a porous coating layer and improved properties and an electrochemical device comprising the same.

Technical Solution

An aspect of the present disclosure provides a separator for an electrochemical device according to the following embodiments.

A first embodiment relates to a separator for an electrochemical device comprising a porous polymer substrate, and a porous coating layer formed on at least one surface of the porous polymer substrate, wherein the porous coating layer comprises a binder polymer, the binder polymer comprises P (VDF-TrFE-CTFE) and PVDF-CTFE, a β-phase amount of the P (VDF-TrFE-CTFE) is 0.90 or above, and a weight ratio of the P (VDF-TrFE-CTFE) to the PVDF-CTFE is 35:65 to 87:13.

A second embodiment relates to the separator for an electrochemical device according to the first embodiment, wherein the weight ratio of the P (VDF-TrFE-CTFE) to the PVDF-CTFE is 50:50 to 80:20.

A third embodiment relates to the separator for an electrochemical device according to any one of the preceding embodiments, wherein the P (VDF-TrFE-CTFE) comprises 10 wt % or less of CTFE based on the weight of the P (VDF-TrFE-CTFE).

A fourth embodiment relates to the separator for an electrochemical device according to any one of the preceding embodiments, wherein the porous coating layer is 1 μm to 10 μm in thickness.

A fifth embodiment relates to the separator for an electrochemical device according to any one of the preceding embodiments, wherein the porous coating layer further comprises inorganic particles.

A sixth embodiment relates to the separator for an electrochemical device according to the fifth embodiment, wherein a weight ratio of the inorganic particles to the binder polymer is 90:10 to 60:40.

A seventh embodiment relates to the separator for an electrochemical device according to the fifth or sixth embodiment, wherein the porous coating layer is 1 μm to 15 μm in thickness.

An eighth embodiment relates to the separator for an electrochemical device according to any one of the preceding embodiments, wherein the separator has a resistance of 0.8 ohm or less, and a Lami Strength with an electrode of 50 gf/25 mm or above.

Another aspect of the present disclosure provides an electrochemical device according to the following embodiments.

A ninth embodiment relates to an electrochemical device comprising a positive electrode, a negative electrode and a separator interposed between the positive electrode and the negative electrode, wherein the separator is manufactured according to any one of the first to eighth embodiments.

A tenth embodiment relates to the electrochemical device according to the ninth embodiment, wherein the electrochemical device is a lithium secondary battery.

Advantageous Effects

According to an embodiment of the present disclosure, it is possible to provide a separator using a binder polymer having predetermined properties to reduce the resistance and make it suitable for use as a separator for an electrochemical device and an electrochemical device comprising the same.

Additionally, it is possible to provide a suitable Lami strength for a stack process due to high adhesive strength on the surface of the porous coating layer, and increase the Lami strength between the separator and the electrode.

BRIEF DESCRIPTION OF THE DRAWING

The FIGURE shows Fourier-Transform Infrared Spectroscopy (FT-IR) spectrum of the PVDF crystal structure in separators according to example 1 and comparative examples 6 and 7.

BEST MODE

Hereinafter, the present disclosure will be described in detail. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

It will be further understood that when an element is referred to as being 「connected to」 another element, it can be 「directly connected to」 the other element or intervening elements may be present. Additionally, the connection covers physical connection as well as electrochemical connection.

The term 「comprises」 when used in this specification, specifies the presence of stated elements, but does not preclude the presence or addition of one or more other elements, unless the context clearly indicates otherwise.

Additionally, 「comprise」 and/or 「comprising」 when used in this specification, specifies the presence of stated features, integers, steps, operations, elements, components and/or groups thereof, but does not preclude the presence or addition of one or more other features, integers, operations, elements, components, and/or groups thereof.

It will be understood that 「about」 and 「substantially」 are used herein in the sense of at, or nearly at, when given the manufacturing and material tolerances inherent in the stated circumstances and are used to prevent the unscrupulous infringer from unfairly taking advantage of the disclosure where exact or absolute figures are stated as an aid to understanding the present disclosure.

It will be further understood that 「combination(s) thereof」 in Markush type language as used herein, refers to a mixture or combination of one or more selected from the group consisting of elements stated in Markush type language, and specifies the inclusion of one or more selected from the group consisting of the elements.

「A and/or B」 when used in this specification, specifies 「either A or B or both」..

Hereinafter, the present disclosure will be described in detail.

In an electrochemical device, for example, a lithium secondary battery, a separator generally exhibit thermal shrinkage behaviors due to using a porous polymer substrate. Accordingly, a porous coating layer is introduced to reduce the thermal shrinkage of the separator.

However, a binder polymer used in the porous coating layer is resistive, and as a result, the characteristics of the binder polymer greatly affect improved battery output.

In view of this fact, the inventors improve the properties of the binder polymer. Accordingly, the inventors provide a separator with low resistance and improved battery output and an electrochemical device comprising the same.

Polyvinylidene fluoride-based binder polymer may be present in crystal structures of three forms, α-phase, β-phase and γ-phase. Among them, β-phase is more polar due to the arrangement of highly electronegative fluorine (F) atoms in one direction. In contrast, α-phase and γ-phase are less polar or nonpolar due to the arrangement of fluorine atoms in opposite directions.

Taking advantage of the characteristics of the polyvinylidene fluoride-based binder polymer, the inventors apply the polyvinylidene fluoride-based binder polymer as a predetermined binder polymer in the porous coating layer. Accordingly, the inventors provide a separator with low resistance and improved output by forming a local electric field in the porous coating layer to allow lithium cations to move quickly in the separator, and an electrochemical device comprising the same.

The inventors use P(VDF-TrFE-CTFE) and PVDF-CTFE together to improve the phase separation characteristics, thereby providing a separator with low resistance and improved Lami strength with the electrode.

Accordingly, a separator according to an aspect of the present disclosure comprises:
  a porous polymer substrate; and
  a porous coating layer formed on at least one surface of
    the porous polymer substrate,
  wherein the porous coating layer comprises a binder
    polymer,
  the binder polymer comprises poly(vinylidene fluoride-
    trifluoroethylene-chlorotrifluoroethylene, P(VDF-
    TrFE-CTFE)) and polyvinylidene fluoride-chlorotrifluoroethylene (PVDF-CTFE),
  a β-phase amount of the P(VDF-TrFE-CTFE) is 0.90 or
    above, and
  a weight ratio of the P(VDF-TrFE-CTFE) and the PVDF-
    CTFE is 35:65 to 87:13.

The separator according to an aspect of the present disclosure comprises P(VDF-TrFE-CTFE) and PVDF-CTFE as the binder polymer in the porous coating layer.

The poly(vinylidene fluoride-trifluoroethylene-chlorotrifluoroethylene, P(VDF-TrFE-CTFE)) is terpolymer, and the β-phase amount is 0.90 or above. Since the P(VDF-TrFE-CTFE) has a high β-phase amount of 0.90 or above, it is advantageous in the formation of a local ion channel when applied in the porous coating layer. Additionally, the P(VDF-TrFE-CTFE) can keep the β-phase amount high without any separate process such as thermal treatment and stretching, and with no addition of any additive. Accordingly, it is possible to reduce the resistance of the separator.

However, in case that P(VDF-TrFE-CTFE) is used alone, especially, when the porous coating layer is thin, the Lami strength between the porous coating layer and the electrode is low.

To solve the problem, the inventors use P(VDF-TrFE-CTFE) and PVDF-CTFE together.

The porous coating layer according to an aspect of the present disclosure comprises P(VDF-TrFE-CTFE) and PVDF-CTFE together to form a thin adhesive layer on the porous coating layer using the phase separation characteristics of the PVDF-CTFE. Presumably, this is because the PVDF-CTFE is sensitive to moisture and thus is solidified quickly. Additionally, the β-phase amount in the binder polymer is high, thereby providing the separator with low resistance and improved Lami strength with the electrode.

In a particular embodiment of the present disclosure, the weight ratio of the P(VDF-TrFE-CTFE) and the PVDF-CTFE may be 35:65 to 87:13, 50:50 to 80:20, or 50:50 to 67:33. Within the above-described range, the separator may have low resistance and improved Lami strength with the electrode. Particularly, when P(VDF-TrFE-CTFE) is present in excess, the β-phase amount in the binder is high, thereby improving the resistance of the porous coating layer.

In a particular embodiment of the present disclosure, the P(VDF-TrFE-CTFE) binder polymer may comprise 10 wt % or less of CTFE based on its weight.

When the porous coating layer does not comprise inorganic particles, the thickness of the porous coating layer is preferably 0.1 μm to 10 μm, and specifically 0.5 μm to 4 μm on the basis of coating on one surface. When inorganic particles are not included, the porous coating layer may be thinner by the controlled thickness reduction, thereby increasing the energy density of an electrochemical device.

In the separator according to an aspect of the present disclosure, the porous coating layer may further comprise inorganic particles.

The inorganic particles are not limited to a particular type if they are electrochemically stable. That is, the inorganic particles that may be used in the present disclosure are not limited to a particular type if they do not cause oxidation and/or reduction reactions in the operating voltage range (for example, 0~5V versus Li/Li+) of an electrochemical device used. In particular, the use of inorganic particles of high dielectric constants as the inorganic particles contributes to the increased degree of dissociation of an electrolyte salt, for example, a lithium salt, in a liquid electrolyte, thereby improving the ionic conductivity of an electrolyte solution.

By the above-described reasons, the inorganic particles may comprise inorganic particles having the dielectric constant of 5 or more, inorganic particles capable of transporting lithium ions and a combination thereof.

The inorganic particles having the dielectric constant of 5 or more may comprise at least one selected from the group consisting of $Al_2O_3$, $SiO_2$, $ZrO_2$, $AlO(OH)$, $TiO_2$, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, $MgO$, $NiO$, $CaO$, $ZnO$ and $SiC$.

The inorganic particles capable of transporting lithium ions may comprise at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$).

Additionally, the average particle size of the inorganic particles is not particularly limited, but for the porous coating layer of a uniform thickness and appropriate porosity, the average particle size preferably ranges between 0.001 and 10 μm., more preferably 1 to 700 nm, and much more preferably 20 to 500 nm.

When the porous coating layer comprises the inorganic particles, the thickness of the porous coating layer is 1 to 15 μm, more specifically 1.5 to 5 μm on the basis of coating on one surface, and the porosity of the porous coating layer is preferably 35 to 85%, but there is no limitation on the thickness and porosity of the porous coating layer. The porous coating layer comprising the inorganic particles has the improved thermal shrinkage.

In a particular embodiment of the present disclosure, the weight ratio of the inorganic particles and the binder polymer may be 90:10 to 60:40. When the ratio of the inorganic particles to the binder polymer satisfies the above range, it is possible to prevent the reduction in the pore size and the porosity of the porous coating layer due to the high amount of the binder polymer, and the reduction in the peel resistance of the porous coating layer due to the low amount of the binder polymer.

In addition, the porous coating layer-forming slurry may further comprise a binder polymer having the adhesive properties commonly used in the art besides the polyvinylidene fluoride-based polymer.

In addition to the inorganic particles and the binder polymer, a method for manufacturing a separator according to an aspect of the present disclosure may further comprise an additive as a component of the porous coating layer.

The separator according to an aspect of the present disclosure may be manufactured by a method commonly used in the art.

For example, a polymer solution may be prepared by dissolving a binder polymer in a solvent.

Subsequently, the prepared polymer solution may be coated on a porous polymer substrate and dried to form a porous coating layer.

The separator according to an aspect of the present disclosure may be manufactured by a method commonly used in the art.

For example, a porous coating layer-forming slurry may be prepared by dissolving a binder polymer in a solvent, and adding inorganic particles, followed by pulverization and dispersion.

Subsequently, the prepared slurry may be coated on a porous polymer substrate and dried to form a porous coating layer.

Non-limiting examples of the available solvent may comprise at least one selected from water, acetone, tetrahydrofuran, methylenechloride, chloroform, dimethylformamide, N-methyl-2-pyrrolidone, methylethylketone and cyclohexane.

The method for coating the polymer solution or the porous coating layer-forming slurry on the porous polymer substrate is not limited to a particular type, but a slot coating method or a dip coating method is desirable. The slot coating involves coating the slurry supplied through a slot die onto the front surface of the substrate, and may control the thickness of the coating layer according to the flow rate supplied from a constant volume pump. Additionally, the dip coating is a coating method including dipping the substrate in a tank containing the slurry, and may control the thickness of the coting layer according to the concentration of the slurry and the speed at which the substrate is taken out of the slurry tank, and for more accurate control of the coating thickness, after dipping, measurement may be performed through a Meyer bar.

The porous polymer substrate coated with the porous coating layer-forming slurry is dried using a dryer such as an oven to form a porous coating layer on at least one surface of the porous polymer substrate.

In the porous coating layer, the inorganic particles are packed in contact such that the inorganic particles are bonded by the binder polymer, forming interstitial volumes therebetween, and the interstitial volumes are empty spaces that are to be pores.

That is, the binder polymer may bind the inorganic particles to hold them together, and for example, the binder polymer may adhere and immobilize the inorganic particles. Additionally, the interstitial volumes between the inorganic particles are empty spaces that are to be the pores of the porous coating layer, and may be spaces defined by the inorganic particles substantially in surface contact in the closely packed or densely packed structure by the inorganic particles.

In detail, the porous polymer substrate may be a porous polymer film substrate or a porous polymer nonwoven substrate.

The porous polymer film substrate may be a porous polymer film of polyolefin such as polyethylene and polypropylene, and the polyolefin porous polymer film substrate exhibits a shutdown function, for example, at the temperature of 80° C. to 150° C.

In this instance, the polyolefin porous polymer film may be made of polyolefin-based polymer including polyethylene such as high density polyethylene, linear low density polyethylene, low density polyethylene and ultra high molecular weight polyethylene, polypropylene, polybutylene and polypentene, used singly or in combination.

Additionally, the porous polymer film substrate may be formed in the shape of a film using various types of polymers such as the above-described polyolefin as well as polyester. Additionally, the porous polymer film substrate may be formed by stacking two or more film layers, and each film layer may be formed from polymer such as polyolefin and polyester as described above, used singly or in combination.

Additionally, in addition to the polyolefin-based polymer, the porous polymer film substrate and the porous nonwoven substrate may be formed from polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalene, used singly or in combination.

The thickness of the porous polymer substrate is not particularly limited, but the thickness is particularly 1 to 100 μm, more particularly 5 to 50 μm, and preferably, the pore size of the porous polymer substrate may be 0.01 to 50 μm and the porosity may be 20 to 75%, but the pore size and porosity are not limited thereto.

In a particular embodiment of the present disclosure, the separator manufactured as described above may have the resistance of 0.8 ohm or less and the Lami strength with the electrode of 50 gf/25 mm or above. Within the above-described range, the electrode has low resistance and high Lami strength with the separator and thus is suitable for use as a separator for an electrochemical device.

An electrochemical device according to an aspect of the present disclosure includes a positive electrode (cathode), a negative electrode (anode), and a separator interposed between the positive electrode and the negative electrode, and the separator is the above-described separator according to an embodiment of the present disclosure.

The electrochemical device may include any type of device using electrochemical reactions, and for example, may include primary and secondary batteries, fuel cells, solar cells or capacitors such as super capacitors. In particular, among the secondary batteries, lithium secondary batteries including lithium metal secondary batteries, lithium ion secondary batteries, lithium polymer secondary batteries or lithium ion polymer secondary batteries are desirable.

The positive and negative electrodes to be used with the separator of the present disclosure are not limited to a particular type, and may be manufactured by binding an electrode active material to an electrode current collector by a common method known in the technical field pertaining to the present disclosure. Of the electrode active material, non-limiting examples of the positive electrode active material may include general positive electrode active materials commonly used in positive electrodes of electrochemical devices, and preferably include lithium manganese oxide, lithium cobalt oxide, lithium nickel oxide, lithium iron oxide or their lithium composite oxide. Non-limiting examples of the negative electrode active material may include general negative electrode active materials commonly used in negative electrodes of electrochemical devices, and preferably include lithium adsorption materials such as lithium metal or lithium alloy, carbon, petroleum coke, activated carbon, graphite or other carbons. Non-limiting examples of the positive electrode current collector may include a foil made of aluminum, nickel or a combination thereof, and non-limiting examples of the negative electrode current collector may include a foil made of copper, gold, nickel or copper alloy or a combination thereof.

An electrolyte solution which may be used in the electrochemical device of the present disclosure may include, but is not limited to, electrolyte solutions in which a salt is dissolved or dissociated in an organic solvent, the salt having a structure represented by, for example, $A^+B^-$, wherein $A^+$ is an alkali metal cation such as $Li^+$, $Na^+$, $K^+$ or a combination thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the organic solvent including propylene carbonate (PC), ethylene carbonate (EC), diethylcarbonate (DEC), dimethylcarbonate (DMC), dipropylcarbonate (DPC), dimethyl sulfoxide, acetonitrile, dimethoxyethane, diethoxyethane, tetrahydrofuran, N-methyl-2-pyrrolidone (NMP), ethylmethylcarbonate (EMC), γ-butyrolactone, or their mixtures.

The pouring of the electrolyte solution may be performed in any suitable step of the battery manufacturing process according to a manufacturing process and required properties of a final product. That is, the pouring of the electrolyte solution may be applied before battery assembly or in the final step of battery assembly.

Hereinafter, the present disclosure will be described in detail through examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

P(VDF-TrFE-CTFE) (β-phase amount: 0.98) and PVDF-CTFE as binder polymer are added to an acetone solvent at a weight ratio of 50:50 and dissolved at 50° C. for about 4 hours to prepare a binder polymer solution. In this instance, a ratio of the solvent and the solids (the weight of the slurry from which the solvent is removed) in the binder polymer solution is 19:1.

Subsequently, the binder polymer solution is dip-coated on two surfaces of a 9 μm thick polyethylene porous polymer substrate (porosity: 43%, air permeation time: 110 sec, resistance 0.45 ohm) and dried in the condition of 23° C. and relative humidity of 40% to manufacture a separator having a porous coating layer.

Example 2

P(VDF-TrFE-CTFE) (β-phase amount: 0.98) and PVDF-CTFE as binder polymer are added to an acetone solvent at a weight ratio of 50:50 and dissolved at 50° C. for about 4 hours to prepare a binder polymer solution. Subsequently, alumina (Al$_2$O$_3$) (particle size: 500 nm) and boehmite (AlOOH) (particle size: 250 nm) as inorganic particles are mixed at a weight ratio of 9:1, and added to the binder polymer solution such that a weight ratio of the binder polymer and the inorganic particles is 20:80. 2 parts by weight of a dispersant is added based on 100 parts by weight of the inorganic particles, and the inorganic particles are pulverized and dispersed using the ball mill method for 12 hours to prepare a porous coating layer-forming slurry. In this instance, a ratio of the solvent and the solids is controlled to 4:1.

The porous coating layer-forming slurry is dip-coated on two surfaces of a 9 μm thick polyethylene porous polymer substrate (porosity: 43%, air permeation time: 110 sec, resistance 0.45 ohm) and dried in the condition of 23° C. and relative humidity of 40% to manufacture a separator having a porous coating layer.

Examples 3 to 4

A separator is manufactured by the same method as example 2 except that the amounts of P(VDF-TrFE-CTFE) and PVDF-CTFE are controlled as shown in Table 1.

Comparative Examples 1 to 8

A separator is manufactured by the same method as example 2 except that the types and amounts of inorganic particles and binder polymer are controlled as shown in Table 1.

In this instance, the β-phase amount of the used PVDF-HFP is 0.47, and the β-phase amount of the PVDF-CTFE is 0.45.

Comparative Examples 9 to 10

A separator is manufactured by the same method as example 2 except that the amounts of P(VDF-TrFE-CTFE) and PVDF-CTFE are controlled as shown in Table 1.

Experimental Example (1) The thickness, loading amount, resistance, thermal shrinkage and Lami Strength of the separators according to examples 1 to 4 and comparative examples 1 to 10 are shown in Table 1.

TABLE 1

| Classification | | Example 1 | Example 2 | Example 3 | Example 4 | Comparative example 1 | Comparative example 2 | Comparative example 3 |
|---|---|---|---|---|---|---|---|---|
| | | P(VDF-TrFE-CTFE) + PVDF-CTFE (1:1) + No inorganic particle | P(VDF-TrFE-CTFE) + PVDF-CTFE (1:1) + Inorganic particles | P(VDF-TrFE-CTFE) + PVDF-CTFE (67:33) + Inorganic particles | P(VDF-TrFE-CTFE) + PVDF-CTFE (80:20) + Inorganic particles | PVDF-TrFE + Inorganic particles | PVDF-HFP + Inorganic particles | PVDF-TrFE + PVDF-CTFE (1:1) + Inorganic particles |
| P(VDF-TrFE-CTFE) | VDF | 67 | 67 | 67 | 67 | 70 | — | 70 |
| | TrFE | 24 | 24 | 24 | 24 | 30 | — | 30 |
| | CTFE | 9 | 9 | 9 | 9 | 0 | — | 0 |
| PVDF-HFP | VDF | — | — | — | — | — | 85 | — |
| | HFP | — | — | — | — | — | 15 | — |
| PVDF-CTFE | PVDF | 80 | 80 | 80 | 80 | — | — | 80 |
| | CTFE | 20 | 20 | 20 | 20 | — | — | 20 |
| Thickness of separator (um) | | 14.2 | 15.3 | 15.2 | 15.7 | 14.7 | 15.5 | 14.7 |
| Loading amount (g/m$^2$) | | 4.7 | 9.3 | 9.2 | 9.4 | 9.2 | 9.5 | 9.4 |
| Resistance (ohm) | | 0.59 | 0.73 | 0.65 | 0.65 | 0.58 | 1.1 | 0.66 |
| Lami Strength (gf/25 mm) | | 82 | 76 | 79 | 71 | 19 | 23 | 29 |
| Thermal shrinkage (MD/TD, 150° C., 30 min) | | 50% or more shrinkage, impossible to measure | 22/21 | 26/25 | 30/28 | 23/22 | 47/45 | 18/16 |
| Weight ratio of P(VDF-TrFE-CTFE):PVDF-CTFE | | 50:50 | 50:50 | 67:33 | 80:20 | — | — | 50:50 |

| Classification | | Comparative example 4 | Comparative example 5 | Comparative example 6 | Comparative example 7 | Comparative example 8 | Comparative example 9 | Comparative example 10 |
|---|---|---|---|---|---|---|---|---|
| | | PVDF-HFP + PVDF-CTFE (1:1) + Inorganic particles | PVDF-TrFE + No inorganic particle | PVDF-HFP + No inorganic particle | PVDF-CTFE + No inorganic particle | PVDF-CTFE + Inorganic particles | P(VDF-TrFE-CTFE) + PVDF-CTFE (19:1) + Inorganic particles | P(VDF-TrFE-CTFE) + PVDF-CTFE (1:4) + Inorganic particles |
| P(VDF-TrFE-CTFE) | VDF | — | 70 | — | — | — | 67 | 67 |
| | TrFE | — | 30 | — | — | — | 24 | 24 |
| | CTFE | — | 0 | — | — | — | 9 | 9 |
| PVDF-HFP | VDF | 85 | — | 85 | — | — | — | — |
| | HFP | 15 | — | 15 | — | — | — | — |
| PVDF-CTFE | PVDF | 80 | — | — | 80 | 80 | 80 | 80 |
| | CTFE | 20 | — | — | 20 | 20 | 20 | 20 |
| Thickness of separator (um) | | 18.0 | 13.5 | 15.3 | 13.0 | 14.2 | 14.1 | 14.3 |
| Loading amount | | 9.2 | 4.7 | 4.5 | 5.0 | 9.5 | 9.3 | 9.5 |

TABLE 1-continued

| | | | | | | | |
|---|---|---|---|---|---|---|---|
| (g/m²) | | | | | | | |
| Resistance (ohm) | 0.98 | 0.59 | 1.26 | 1.02 | 0.95 | 0.72 | 0.85 |
| Lami Strength (gf/25 mm) | 34 | 38 | 49 | 88 | 39 | 29 | 33 |
| Thermal shrinkage (MD/TD, 150° C., 30 min) | 22/20 | 50% or more shrinkage, impossible to measure | 50% or more shrinkage, impossible to measure | 50% or more shrinkage, impossible to measure | 17/16 | 45/43 | 21/22 |
| Weight ratio of P(VDF-TrFE-CTFE):PVDF-CTFE | — | — | — | — | — | 95:5 | 20:80 |

1) Thickness Measurement Method

The thickness of the separator is measured using a thickness measurement instrument (Mitutoyo, VL-50S-B).

2) Separator Resistance Measurement

A resistance value when the separators manufactured in examples 1 to 4 and comparative examples 1 to 10 are immersed in the electrolyte solution, is measured by the alternating current method at 25° C. using a 1M $LiPF_6$-ethylene carbonate/ethylmethyl carbonate (Weight ratio 3:7) electrolyte solution.

3) Thermal Shrinkage Measurement Method

The thermal shrinkage is calculated by (Initial length−Length after heat shrink treatment at 150° C./min)/(Initial length)×100.

4) Electrode-Separator Lami Strength Measurement Method

To measure the Lami Strength between the electrode and the separator, the negative electrode is manufactured as below.

First, for the negative electrode, artificial graphite, carbon black, carboxy methyl cellulose (CMC) and styrene-butadiene rubber (SBR) are mixed with water at a weight ratio of 96:1:2:2 to prepare a negative electrode slurry. The negative electrode slurry is coated in an amount of 3.5 mAh/cm² on a copper foil (Cu-foil) into the shape of a thin polar plate, and dried at 135° C. for 3 hours or longer and pressed to manufacture a negative electrode.

The negative electrode manufactured as above is tailored to the size of 25 mm×100 mm. The separators manufactured in examples 1 to 4 and comparative examples 1 to 10 are tailored to the size of 25 mm×100 mm. The separator and the negative electrode prepared as above are stacked with a 100 μm PET film interposed between and adhered using a flat plate press. In this instance, the condition of the flat plate press is heated and pressed at 70° C. under the pressure of 600 kgf for 1 second. The separator and the negative electrode adhered to each other are attached to a slide glass using a double-sided tape. The end part of the adhesive surface (10 mm or less from the end of the adhesive surface) of the separator is peeled off and adhered such that the longitudinal direction is connected to a 25×100 mm PET film using a single sided tape. Subsequently, a force is applied 180° at 300 mm/min with the slide glass being placed on a lower holder of UTM instrument (LLOYD Instrument LF Plus) and the PET film adhered with the separator being placed on an upper holder of the UTM instrument, a force required to separate the negative electrode and the porous coating layer opposite the negative electrode is measured.

As can be seen from Table 1, in examples 1 to 4, P(VDF-TrFE-CTFE) and PVDF-CTFE are used together and their weight ratio is controlled. In the case of examples 1 to 4, the resistance value may be low, and as a result, the output of an electrochemical device comprising the separator may be improved. The resistance value is low, and besides the Lami strength between the electrode and the separator is high, and thus when manufacturing an electrochemical device, process capacity may be improved and the properties may be improved. In the case of example 1, inorganic particles are not added, and in this case, it can be seen that thermal shrinkage is not improved. However, the resistance value is very low and the separator is thin, high energy density can be calculated high, so it can be used for a type of electrochemical device that is not strict with thermal shrinkage.

On the other hand, in comparative examples 1, 2, 5 to 8, P(VDF-TrFE-CTFE) and PVDF-CTFE are not used together. In the case of comparative example 1, the Lami Strength is low and it is not suitable for use as a separator requiring a stack process, i.e., Lami strength with the electrode. In the case of comparative example 2, the Lami Strength is low and the resistance value is high, and thus it is not suitable for use as a separator. In the case of comparative examples 5 to 8, the resistance value is high and the Lami Strength is low, and thus it is not suitable for use as a separator. In the case of comparative examples 3 to 4, P(VDF-TrFE-CTFE) is not used, and in the case of comparative example 3, the Lami strength with the electrode is low. In the case of comparative example 4, the resistance value is high and the Lami Strength is low, and thus it is not suitable for use as a separator. In comparative examples 9 to 10, P(VDF-TrFE-CTFE) and PVDF-CTFE are used together, but the amount of P(VDF-TrFE-CTFE) or the ratio of PVDF-CTFE is too high to ensure the Lami strength with the electrode. In detail, in the case of comparative example 9, the ratio of PVDF-CTFE is 5 wt % or less, and thus it is impossible to ensure the Lami strength in the thin film. In the case of comparative example 10, the ratio of PVDF-CTFE is on the level of 80 wt %, and due to the quick phase separation of the CTFE, pores are not formed well, failing to ensure the Lami strength, and there is a resistance increase.

(2) Table 2 and The FIGURE show Fourier-Transform Infrared Spectroscopy (FT-IR) spectrum of the PVDF crystal structure in the separators according to example 1 and comparative examples 6 and 7.

TABLE 2

| Classification | | A(α) | A(β) | F(β) | Avg. F(β) |
|---|---|---|---|---|---|
| Example 1 | #1 | 0.038 | 0.000 | 1.01 | 0.99 |
| (P(VDF-TrFE-CTFE)) | #2 | 0.036 | 0.000 | 1.01 | |
| | #3 | 0.030 | 0.000 | 1.02 | |
| Comparative example 6 | #1 | 0.028 | 0.066 | 0.65 | 0.65 |
| | #2 | 0.029 | 0.069 | 0.65 | |
| (PVDF-HFP) | #3 | 0.029 | 0.066 | 0.65 | |
| Comparative example 7 | #1 | 0.061 | 0.047 | 0.38 | 0.39 |
| | #2 | 0.055 | 0.047 | 0.40 | |
| (PVDF-CTFE) | #3 | 0.060 | 0.048 | 0.39 | |

In this instance, the AvgF(β) value is calculated by measuring the spectrum of the specimen five times in ATR mode (diamond crystal) using FT-IR spectroscopy and calculating an average of β-phase crystal structure ratios. F(β) is calculated by the following Equation 1.

$$F(\beta) = \frac{A_\beta}{(K_\beta/K_\alpha)A_\alpha + A_\beta} \quad \text{[Equation 1]}$$

• Absorption coefficient $$K(\alpha) = 6.1 \times 10^4 \text{ cm}^2/\text{mol}$$

$$K(\beta) = 7.7 \times 10^4 \text{ cm}^2/\text{mol}$$

As can be seen from Table 2, when the β-phase amount of the P(VDF-TrFE-CTFE) is 0.90 or above, as can be seen from The FIGURE, in the case of example 1, the β-phase amount is also high, and thus the separator has low resistance. In contrast, in the case of comparative examples 6, 7, the β-phase amount is 0.65 and 0.39 respectively, and the resistance is high.

What is claimed is:

1. A separator for an electrochemical device, comprising:
   a porous polymer substrate; and
   a porous coating layer on at least one surface of the porous polymer substrate,
   wherein the porous coating layer comprises a binder polymer,
   wherein the binder polymer comprises poly (vinylidene fluoride-trifluoroethylene-chlorotrifluoroethylene P (VDF-TrFE-CTFE) and polyvinylidene fluoride-chlorotrifluoroethylene (PVDF-CTFE),
   wherein a β-phase amount of the P (VDF-TrFE-CTFE) is 0.90 or above, and
   wherein a weight ratio of the P (VDF-TrFE-CTFE) to the PVDF-CTFE is 35:65 to 87:13.

2. The separator for the electrochemical device according to claim 1, wherein the weight ratio of the P (VDF-TrFE-CTFE) to the PVDF-CTFE is 50:50 to 80:20.

3. The separator for the electrochemical device according to claim 1, wherein the P (VDF-TrFE-CTFE) comprises 10 wt % or less of CTFE based on a total weight of the P (VDF-TrFE-CTFE).

4. The separator for the electrochemical device according to claim 1, wherein the porous coating layer is 1 μm to 10 μm in thickness.

5. The separator for the electrochemical device according to claim 1, wherein the porous coating layer further comprises inorganic particles.

6. The separator for the electrochemical device according to claim 5, wherein a weight ratio of the inorganic particles to the binder polymer is 90:10 to 60:40.

7. The separator for the electrochemical device according to claim 5, wherein the porous coating layer is 1 μm to 15 μm in thickness.

8. The separator for the electrochemical device according to claim 1, wherein the separator has a resistance of 0.8 ohm or less, and a Lami Strength with an electrode of 50 gf/25 mm or above.

9. An electrochemical device, comprising:
   a positive electrode;
   a negative electrode; and
   a separator interposed between the positive electrode and the negative electrode,
   wherein the separator is defined according to claim 1.

10. The electrochemical device according to claim 9, wherein the electrochemical device is a lithium secondary battery.

* * * * *